(12) United States Patent
Abramoff et al.

(10) Patent No.: US 10,360,672 B2
(45) Date of Patent: Jul. 23, 2019

(54) AUTOMATED SEPARATION OF BINARY OVERLAPPING TREES

(71) Applicants: UNIVERSITY OF IOWA RESEARCH FOUNDATION, Iowa City, IA (US); The United States of America, as represented by the Secretary of the Department of Veteran Affairs, Washington, DC (US)

(72) Inventors: Michael D. Abramoff, Iowa City, IA (US); Mona K. Garvin, Iowa City, IA (US); Hu Qiao, Coralville, IA (US)

(73) Assignees: University of Iowa Research Foundation, Iowa, IA (US); The United States of America, as Represented by the Department of Veterans Affairs, Washington, DC (US)

( * ) Notice: Subject to any disclaimer, the term of this patent is extended or adjusted under 35 U.S.C. 154(b) by 0 days.

(21) Appl. No.: 14/774,801

(22) PCT Filed: Mar. 14, 2014

(86) PCT No.: PCT/US2014/028055
§ 371 (c)(1),
(2) Date: Sep. 11, 2015

(87) PCT Pub. No.: WO2014/143891
PCT Pub. Date: Sep. 18, 2014

(65) Prior Publication Data
US 2016/0035088 A1 Feb. 4, 2016

Related U.S. Application Data

(60) Provisional application No. 61/790,594, filed on Mar. 15, 2013.

(51) Int. Cl.
*G06K 9/00* (2006.01)
*G06T 7/00* (2017.01)
(Continued)

(52) U.S. Cl.
CPC ............. *G06T 7/0012* (2013.01); *G06T 7/11* (2017.01); *G06T 7/136* (2017.01); *G06T 7/162* (2017.01);
(Continued)

(58) Field of Classification Search
None
See application file for complete search history.

(56) References Cited

U.S. PATENT DOCUMENTS

| 4,883,061 A | 11/1989 | Zeimer |
| 4,998,533 A | 3/1991 | Winkelman |

(Continued)

FOREIGN PATENT DOCUMENTS

| AU | 2012207076 | 1/2012 |
| AU | 2012207076 | 7/2012 |

(Continued)

OTHER PUBLICATIONS

Boroujeni et al., "Coronary artery center-line extraction using second order local features", Computational and Mathematical Methods in Medicine, 2012.*

(Continued)

*Primary Examiner* — Soo Jin Park
(74) *Attorney, Agent, or Firm* — Ballard Spahr LLP (57) ABSTRACT

Provided are systems and methods for analyzing images. An exemplary method can comprise receiving at least one image having one or more annotations indicating a feature. The method can comprise generating training images from the at least one image. Each training image can be based on a respective section of the at least one image. The training (Continued)

images can comprise positive images having the feature and negative images without the feature. The method can comprise generating a feature space based on the positive images and the negative images. The method can further comprise identifying the feature in one or more unclassified images based upon the feature space.

20 Claims, 6 Drawing Sheets

(51) Int. Cl.
  *G06T 11/20* (2006.01)
  *G06T 7/11* (2017.01)
  *G06T 7/162* (2017.01)
  *G06T 7/136* (2017.01)

(52) U.S. Cl.
  CPC .. *G06T 11/206* (2013.01); *G06T 2207/10004* (2013.01); *G06T 2207/10024* (2013.01); *G06T 2207/20044* (2013.01); *G06T 2207/20072* (2013.01); *G06T 2207/20076* (2013.01); *G06T 2207/30041* (2013.01); *G06T 2207/30101* (2013.01)

(56) References Cited

U.S. PATENT DOCUMENTS

| | | | |
|---|---|---|---|
| 5,233,517 A | 8/1993 | Jindra | |
| 5,270,924 A | 12/1993 | Hideshima | |
| 5,303,709 A | 4/1994 | Dreher et al. | |
| 5,857,030 A | 1/1999 | Gaborski et al. | |
| 5,868,134 A | 2/1999 | Sugiyama et al. | |
| 6,044,181 A | 3/2000 | Szeliski et al. | |
| 6,053,865 A | 4/2000 | Sugiyama et al. | |
| 6,104,828 A | 8/2000 | Shioiri | |
| 6,276,798 B1 | 8/2001 | Gil et al. | |
| 6,453,057 B1 | 9/2002 | Marshall et al. | |
| 6,556,853 B1 | 4/2003 | Cabib et al. | |
| 6,567,682 B1 | 5/2003 | Osterweil et al. | |
| 6,674,894 B1 | 1/2004 | Parker et al. | |
| 6,712,469 B2 | 3/2004 | Ando | |
| 6,714,672 B1 | 3/2004 | Berestov et al. | |
| 6,728,561 B2 | 4/2004 | Smith et al. | |
| 6,731,782 B2 | 5/2004 | Ashton | |
| 6,757,409 B2 | 6/2004 | Marshall et al. | |
| 6,830,336 B2 | 12/2004 | Fransen | |
| 6,845,260 B2 | 1/2005 | Liu et al. | |
| 6,996,260 B1 | 2/2006 | Skands et al. | |
| 7,104,958 B2 | 9/2006 | Crutchfield et al. | |
| 7,206,435 B2 | 4/2007 | Fujimura et al. | |
| 7,232,240 B2 | 6/2007 | Kosnik et al. | |
| 7,242,810 B2 | 7/2007 | Chang | |
| 7,343,032 B2 | 3/2008 | Oakley et al. | |
| 7,474,775 B2 | 1/2009 | Abramoff et al. | |
| 7,524,061 B2 | 4/2009 | Yan et al. | |
| 7,574,028 B2 | 8/2009 | Luo et al. | |
| 7,620,501 B2* | 11/2009 | Tek | G06T 7/0081 382/130 |
| 7,712,898 B2 | 5/2010 | Abramoff et al. | |
| 7,715,597 B2 | 5/2010 | Costache et al. | |
| 8,140,329 B2 | 3/2012 | Zhang et al. | |
| 8,180,134 B2 | 5/2012 | Wang | |
| 8,194,936 B2 | 6/2012 | Abramoff et al. | |
| 8,340,437 B2 | 12/2012 | Abramoff et al. | |
| 8,463,065 B2* | 6/2013 | Sun | G06T 5/20 382/260 |
| 8,611,623 B2* | 12/2013 | Kurihara | G06T 7/181 382/128 |
| 8,616,702 B2 | 12/2013 | Abramoff | |
| 8,634,628 B2* | 1/2014 | Inoue | G06T 3/0037 382/131 |
| 8,639,002 B2 | 1/2014 | Tanaka et al. | |
| 8,761,473 B2* | 6/2014 | Ihara | G06T 7/162 382/128 |
| 8,842,894 B2* | 9/2014 | Ihara | G06T 7/0012 382/128 |
| 9,198,603 B2* | 12/2015 | Sakuragi | A61B 5/02007 |
| 9,307,926 B2 | 4/2016 | Begin et al. | |
| 9,355,458 B2* | 5/2016 | Ihara | A61B 5/08 |
| 9,679,389 B2* | 6/2017 | Ostrovsky-Berman | G06T 7/11 |
| 2002/0024516 A1 | 2/2002 | Chen et al. | |
| 2002/0126915 A1 | 9/2002 | Lai et al. | |
| 2002/0165837 A1 | 11/2002 | Zhang et al. | |
| 2003/0071970 A1 | 4/2003 | Donnerhacke et al. | |
| 2003/0166999 A1 | 9/2003 | Liu et al. | |
| 2003/0215119 A1 | 11/2003 | Uppaluri et al. | |
| 2004/0032488 A1 | 2/2004 | Harman | |
| 2004/0037453 A1 | 2/2004 | Marshall et al. | |
| 2004/0064057 A1 | 4/2004 | Siegel | |
| 2004/0085542 A1 | 5/2004 | Soliz et al. | |
| 2004/0105074 A1 | 6/2004 | Soliz et al. | |
| 2006/0056727 A1 | 3/2006 | Jones et al. | |
| 2006/0140446 A1 | 6/2006 | Luo et al. | |
| 2007/0002275 A1 | 1/2007 | Yan et al. | |
| 2007/0020795 A1 | 1/2007 | Mori et al. | |
| 2007/0058865 A1 | 3/2007 | Li et al. | |
| 2007/0083492 A1 | 4/2007 | Hohimer et al. | |
| 2007/0092864 A1 | 4/2007 | Reinhardt et al. | |
| 2007/0110298 A1 | 5/2007 | Graepel et al. | |
| 2007/0122007 A1 | 5/2007 | Austin et al. | |
| 2007/0183661 A1 | 8/2007 | El-Maleh et al. | |
| 2007/0230795 A1 | 10/2007 | Abramoff et al. | |
| 2007/0244396 A1 | 10/2007 | Vilser et al. | |
| 2008/0205717 A1 | 8/2008 | Reeves et al. | |
| 2008/0240547 A1 | 10/2008 | Cho et al. | |
| 2009/0148024 A1 | 6/2009 | Park | |
| 2009/0257024 A1 | 10/2009 | Luther et al. | |
| 2010/0002929 A1 | 1/2010 | Sammak et al. | |
| 2010/0034457 A1 | 2/2010 | Berliner et al. | |
| 2010/0061601 A1 | 3/2010 | Abramoff et al. | |
| 2010/0074532 A1 | 3/2010 | Gordon et al. | |
| 2010/0082692 A1* | 4/2010 | Akinyemi | G06F 19/3443 707/797 |
| 2010/0103249 A1 | 4/2010 | Lipton et al. | |
| 2010/0104150 A1 | 4/2010 | Saint Felix et al. | |
| 2010/0118161 A1 | 5/2010 | Tsurumi | |
| 2010/0142824 A1 | 6/2010 | Lu | |
| 2010/0182406 A1 | 7/2010 | Benitez | |
| 2010/0271511 A1 | 10/2010 | Ma et al. | |
| 2010/0284180 A1 | 11/2010 | Popovich et al. | |
| 2011/0026794 A1 | 2/2011 | Sundar et al. | |
| 2011/0134221 A1 | 6/2011 | Lee et al. | |
| 2011/0135172 A1* | 6/2011 | Kitamura | G06T 7/0085 382/128 |
| 2012/0078636 A1 | 3/2012 | Ferrucci et al. | |
| 2012/0236259 A1 | 9/2012 | Abramoff et al. | |
| 2012/0237094 A1* | 9/2012 | Kurihara | G06T 7/0085 382/128 |
| 2013/0208960 A1 | 8/2013 | Reisman | |
| 2014/0035901 A1 | 2/2014 | Chen et al. | |
| 2015/0379708 A1 | 12/2015 | Abramoff et al. | |

FOREIGN PATENT DOCUMENTS

| | | |
|---|---|---|
| AU | 2016210680 | 8/2016 |
| CA | 2610345 | 12/2006 |
| CA | 2825169 | 1/2012 |
| CA | 2825169 | 7/2012 |
| EP | 12736290.3 | 1/2012 |
| EP | 2665406 | 7/2012 |
| JP | 2007-097634 A | 4/2007 |
| JP | 2010-500081 A | 1/2010 |
| JP | 2013-550644 | 1/2012 |
| JP | 6005663 B2 | 10/2016 |
| WO | WO-89/05493 | 6/1989 |
| WO | WO-2005/076198 | 8/2005 |
| WO | 2006023990 A2 | 3/2006 |
| WO | WO-2006/023990 A2 | 3/2006 |
| WO | WO-2006/0105473 | 10/2006 |

(56) References Cited

FOREIGN PATENT DOCUMENTS

| WO | WO-2007/031818 | 3/2007 |
|---|---|---|
| WO | WO-2007/118079 | 10/2007 |
| WO | WO-2008/150840 | 12/2008 |
| WO | WO-2010/099289 A1 | 9/2010 |
| WO | PCT/US2011/063537 | 12/2011 |
| WO | PCT/US2012/022111 | 1/2012 |
| WO | WO-2012/078636 | 6/2012 |
| WO | WO-2012/100221 | 7/2012 |
| WO | WO-2012/100225 A1 | 7/2012 |
| WO | PCT/US2014/014298 | 1/2014 |
| WO | PCT/US2014/28055 | 3/2014 |
| WO | WO-2014/143891 A1 | 9/2014 |
| WO | PCT/US2015/022021 | 3/2015 |

OTHER PUBLICATIONS

Szymczak et al., "Coronary vessel trees from 3D imagery: a topological approach", Medical Image Analysis, 2006.*
Agurto, et al., "Multiscale AM-FM Methods for Diabetic Retinopathy Lesion Detection", Feb. 2010, Medical Imaging, IEEE Transactions on, vol. 29, No. 2, 502-512.
Barraga, et al., "Automatic system for diabetic retinopathy screening based on AM-FM, partial least squares, and support vector machines", Apr. 2010, Biomedical Imaging: From Nano to Macro, 2010 IEEE International Symposium on, 1349-1352.
Frangi, et al, "Multiscale Vessel Enhancement Filtering", Medical Image Computing and Computer-Assisted Intervention-MICCAI '98 Lecture Notes in Computer Science vol. 1496, 1998, 130-137.
Quellec, et al., "Optimal Filter Framework for Automated, Instantaneous Detection of Lesions in Retinal Images", Oct. 21, 2010, Medical Imaging, IEEE Transactions on, vol. 30, No. 2, 523-533.
Tuytelaars, et al., "Matching widely separated views based on affine invariant regions." International journal of computer vision 59.1 (Aug. 2004 ): 61-85.
Niemeijer et al; "Automatic determination of the atery vein ratio in retinal images" Medical Imaging 2002, vol. 7624, Mar. 4, 2010 (10 Pages).
Chrastek et al, "Automated Calculation of Retinal Arteriovenous Ratio for Detection and Montoring of Cerebrovascular Disease Based on Assessment of Morphological Changes of Rentinal Vascular System" MVA 2002 Proceedings of IAPR Workshop on Machine Vision Applications, Dec. 13, 2002, pp. 240-243 (4 Pages).
Muramatsu et al, "Automated selection of major arteries and veins for measurement of arteriolar-to-venular diameter ratio on retinal fundus images" Computerized medical imaging and graphics, vol. 35, No. 6, Mar. 16, 2011 pp. 472-480 (9 Pages).
Wong et al, "Computer-Assisted Measurement of Rentinal Vessel Diameters in the Beaver Dam Eye Study Methodolgy, Correlation Between Eyes, and Effect of Refractive Errors" Ophthalmology, vol. 111, No. 6, Jun. 1, 2004, pp. 1183-1190 (8 Pages).
European Search Report dated Mar. 16, 2016 by the European Patent Office for Application No. 12736290.3, which was filed on Jan. 20, 2011, and published as 2665406, on Nov. 27, 2013 (Inventor—Michael D. Abramoff et al; Applicant—) (11Pages).
Kondermann, et al "Blood Vessel Classification into Arteries and Veins in Retinal Images" Proc. of SPIE 6512 (2007): pp. 651247-1 to 651247-9, Print. (9 Pages).
U.S. Appl. No. 61/420,497, filed Dec. 7, 2010, Abramoff et al (Univ. of Iowa).
U.S. Appl. No. 13/992,552 (U.S. Pat. No. 2013-0301889-A1), filed Jul. 25, 2013 (dated Nov. 14, 2013), Abramoff et al (Univ. of Iowa).
U.S. Appl. No. 61/434,551, filed Jan. 20, 2011, Abramoff et al (Univ. of Iowa).
U.S. Appl. No. 13/355,386 (U.S. Pat. No. 2012-0236259-A1), filed Jan. 20, 2012 (dated Sep. 20, 2012), Abramoff et al (Univ. of Iowa).
U.S. Appl. No. 61/759,201, filed Jan. 31, 2013, Abramoff et al (Univ. of Iowa).
U.S. Appl. No. 14/764,926 (U.S. Pat. No. 2015-0379708-A1), filed Jan. 31, 2014 (dated Dec. 31, 2015), Abramoff et al (Univ. of Iowa).
U.S. Appl. No. 61/968,713, filed Mar. 21, 2014, Abramoff et al (Univ. of Iowa).
U.S. Appl. No. 15/128,035, filed Mar. 23, 2015, Abramoff et al (Univ. of Iowa).
Final Rejection was dated Nov. 13, 2015 by the U.S. Patent and Trademark Office for U.S. Appl. No. 13/992,552, which was filed Jul. 25, 2013 and published as U.S. Pat. No. 2013-0301889-A1 on Nov. 4, 2013 (Applicant—University of Iowa Research Foundation; Inventor—Michael D. Abramoff, et al.) (32 Pages).
Final Rejection was dated Nov. 9, 2016 by the U.S. Patent and Trademark Office for U.S. Appl. No. 13/355,386, which was filed Jan. 20, 2012 and published as U.S. Pat. No. 2012-0236259 A1 on Sep. 20, 2012 (Applicant—University of Iowa Research Foundation; Inventor—Michael D. Abramoff et al) (14 Pages).
Final Rejection was dated Mar. 11, 2014 by the U.S. Patent and Trademark Office for U.S. Appl. No. 13/355,386, which was filed Jan. 20, 2012 and published as U.S. Pat. No. 2012-0236259-A1 on Sep. 20, 2012 (Applicant—University of Iowa Research Foundation; Inventor—Michael D. Abramoff, et al.) (17 Pages).
Final Rejection was dated Jun. 23, 2015 by the U.S. Patent and Trademark Office for U.S. Appl. No. 13/355,386, which was filed Jan. 20, 2012 and published as U.S. Pat. No. 2012-0236259-A1 on Sep. 20, 2012 (Applicant—University of Iowa Research Foundation; Inventor—Michael D. Abramoff, et al.) (17 Pages).
International Preliminary Report on Patentability dated Sep. 29, 2016 for application PCT/US2015/022021, filed on Mar. 23, 2015, and published as WO 2015/143435 Sep. 24, 2015 (Applicant—University of Iowa Research Foundation // Inventor—Abramoff, et al.) (7 pages).
International Preliminary Report on Patentability was dated Jun. 12, 2013 by the International Searching Authority for Application No. PCT/US2011/63537 , which was filed on Dec. 6, 2011 and published as WO 2012/078636 on Jun. 14, 2012 (Applicant—University of Iowa Research Foundation) (11 Pages).
International Preliminary Report on Patentability was dated Jul. 23, 2013 by the International Searching Authority for Application No. PCT/US2012/022111, which was filed on Jan. 20, 2012 and published as WO/2012/100221 on Jul. 26, 2012 (Applicant—University of Iowa Research Foundation) (7 Pages).
International Preliminary Report on Patentability was dated Aug. 4, 2015 by the International Searching Authority for Application No. PCT/US2014/014298, which was filed on Jan. 31, 2014 and published as WO/2014/158345 on Oct. 2, 2014 (Applicant—University of Iowa Research Foundation) (6 Pages).
International Preliminary Report on Patentability was dated Sep. 15, 2015 by the International Searching Authority for Application No. PCT/US2014/28055, which was filed on Mar. 14, 2014 and published as WO 2014/143891 on Sep. 18, 2014 (Applicant—University of Iowa Research Foundation) (5 Pages).
International Search Report and Written Opinion dated Aug. 5, 2015 for application PCT/US2015/022021, filed on Mar. 23, 2015, and published as WO 2015/143435 Sep. 24, 2015 (Applicant—University of Iowa Research Foundation // Inventor—Abramoff, et al.) (16 pages).
International Search Report and Written Opinion was dated Apr. 3, 2012 by the International Searching Authority for Application No. PCT/US2011/63537 , which was filed on Dec. 6, 2011 and published as WO 2012/078636 on Jun. 14, 2012 (Applicant—University of Iowa Research Foundation) (11 Pages).
International Search Report and Written Opinion was dated May 25, 2012 by the International Searching Authority for Application No. PCT/US2012/022111, which was filed on Jan. 20, 2012 and published as WO/2012/100221 on Jul. 26, 2012 (Applicant—University of Iowa Research Foundation) (7 Pages).
International Search Report and Written Opinion was dated Aug. 15, 2014 by the International Searching Authority for Application No. PCT/US2014/28055, which was filed on Mar. 14, 2014 and published as WO 2014/143891 on Sep. 18, 2014 (Applicant—University of Iowa Research Foundation) (6 Pages).
International Search Report and Written Opinion was dated Sep. 4, 2014 by the International Searching Authority for Application No. PCT/US2014/014298, which was filed on Jan. 31, 2014 and pub- (56) References Cited

OTHER PUBLICATIONS lished as WO/2014/158345 on Oct. 2, 2014 (Applicant—University of Iowa Research Foundation) (7 Pages).
Klein, Barbara E. et al "Cardiovascular Disease, Mortality, and Retinal Microvascular Characteristics in Type 1 Diabetes"Arch Intern Med. Sep. 27, 2004;164(17):1917-24.
Non Final Rejection was dated Jan. 27, 2017 by the U.S. Patent and Trademark Office for U.S. Appl. No. 14/764,926, which was filed Jul. 30, 2015 and published as U.S. Pat. No. 2015-0379708 A1 on Dec. 31, 2015 (Applicant—University of Iowa Research Foundation; Inventor—Michael D. Abramoff et al) (9 Pages).
Non Final Rejection was dated Feb. 6, 2015 by the U.S. Patent and Trademark Office for U.S. Appl. No. 13/355,386, which was filed Jan. 20, 2012 and published as U.S. Pat. No. 2012-0236259-A1 on Sep. 20, 2012 (Applicant—University of Iowa Research Foundation; Inventor—Michael D. Abramoff, et al.) (13 Pages).
Non Final Rejection was dated Mar. 30, 2016 by the U.S. Patent and Trademark Office for U.S. Appl. No. 13/355,386, which was filed Jan. 20, 2012 and published as U.S. Pat. No. 2012-0236259-A1 on Sep. 20, 2012 (Applicant—University of Iowa Research Foundation; Inventor—Michael D. Abramoff, et al.) (12 Pages).
Non Final Rejection was dated May 11, 2015 by the U.S. Patent and Trademark Office for U.S. Appl. No. 13/992,552, which was filed Jul. 25, 2013 and published as U.S. Pat. No. 2013-0301889-A1 on Nov. 4, 2013 (Applicant—University of Iowa Research Foundation; Inventor—Michael D. Abramoff, et al.) (31 Pages).
Non Final Rejection was dated Jul. 11, 2016 by the U.S. Patent and Trademark Office for U.S. Appl. No. 13/992,552, which was filed Jul. 25, 2013 and published as U.S. Pat. No. 2013-0301889-A1 on Nov. 4, 2013 (Applicant—University of Iowa Research Foundation; Inventor—Michael D. Abramoff, et al.) (37 Pages).
Non Final Rejection was dated Sep. 19, 2013 by the U.S. Patent and Trademark Office for U.S. Appl. No. 13/355,386, which was filed Jan. 20, 2012 and published as U.S. Pat. No. 2012-0236259-A1 on Sep. 20, 2012 (Applicant—University of Iowa Research Foundation; Inventor—Michael D. Abramoff, et al.) (16 Pages).
Preliminary Amendment was dated Jun. 19, 2012 to the U.S. Patent and Trademark Office for U.S. Appl. No. 13/355,386, which was filed Jan. 20, 2012 and published as U.S. Pat. No. 2012-0236259-A1 on Sep. 20, 2012 (Applicant—University of Iowa Research Foundation; Inventor—Michael D. Abramoff, et al.) (3 Pages).
Preliminary Amendment was dated Jun. 7, 2013 to the U.S. Patent and Trademark Office for U.S. Appl. No. 13/992,552, which was filed Jul. 25, 2013 and published as U.S. Pat. No. 2013-0301889-A1 on Nov. 4, 2013 (Applicant—University of Iowa Research Foundation; Inventor—Michael D. Abramoff, et al.) (8 Pages).
Preliminary Amendment was dated Jul. 30, 2015 to the U.S. Patent and Trademark Office for U.S. Appl. No. 14/764,926 , which was filed Jul. 30, 2015 and published as U.S. Pat. No. 2015-0379708 A1 on Dec. 31, 2015 (Applicant—University of Iowa Research Foundation; Inventor—Michael D. Abramoff, et al.) (4 Pages).
Response to Final Rejection was dated Aug. 24, 2015 to the U.S. Patent and Trademark Office for U.S. Appl. No. 13/355,386, which was filed Jan. 20, 2012 and published as U.S. Pat. No. 2012-0236259-A1 on Sep. 20, 2012 (Applicant—University of Iowa Research Foundation; Inventor—Michael D. Abramoff, et al.) (11 Pages).
Response to Non Final Rejection was dated Oct. 12, 2015 to the U.S. Patent and Trademark Office for U.S. Appl. No. 13/992,552, which was filed Jul. 25, 2013 and published as U.S. Pat. No. 2013-0301889-A1 on Nov. 4, 2013 (Applicant—University of Iowa Research Foundation; Inventor—Michael D. Abramoff, et al.) (12 Pages).
Response to Non Final Rejection was dated Dec. 19, 2013 to the U.S. Patent and Trademark Office for U.S. Appl. No. 13/355,386, which was filed Jan. 20, 2012 and published as U.S. Pat. No. 2012-0236259-A1 on Sep. 20, 2012 (Applicant—University of Iowa Research Foundation; Inventor—Michael D. Abramoff, et al.) (10 Pages).
Response to Non Final Rejection was dated May 6, 2015 to the U.S. Patent and Trademark Office for U.S. Appl. No. 13/355,386, which was filed Jan. 20, 2012 and published as U.S. Pat. No. 2012-0236259-A1 on Sep. 20, 2012 (Applicant—University of Iowa Research Foundation; Inventor—Michael D. Abramoff, et al.) (11 Pages).
Response to Non Final Rejection was dated Sep. 30, 2016 to the U.S. Patent and Trademark Office for U.S. Appl. No. 13/355,386, which was filed Jan. 20, 2012 and published as U.S. Pat. No. 2012-0236259-A1 on Sep. 20, 2012 (Applicant—University of Iowa Research Foundation; Inventor—Michael D. Abramoff, et al.) (9 Pages).
Sharrett, A. Richey et al. "Retinal Arteriolar Diameters and Elevated Blood Pressure." American Journal of Epidemiology (1999), 150(3) 263-270.
Staal, J. et al. "Ridge-Based Vessel Segmentation in Color Images of the Retina." IEEE Transactions on Medical Imaging 23.4 (2004): 501-509.
Final Rejection was dated Mar. 28, 2017 by the USPTO for U.S. Appl. No. 13/992,552, which was filed Jul. 25, 2013 and published as U.S. Pat. No. 2015-0379708 A1 on Dec. 31, 2015 (Applicant—University of Iowa Research Foundation) (39 pages).
Lee et al., "Retinal atlas statistics from color fundus images." Medical Imaging: Image Processing. 2010 (10 pages).
Non Final Rejection was dated Dec. 11, 2017 by the Uspto Office for U.S. Appl. No. 13/992,552, which was filed Jul. 25, 2013 and published as U.S. Pat. No. 2013-0301889 A1 on Nov. 14, 2013 (Applicant—Michael D. Abramoff) (33 pages).
Non Final Rejection was dated Dec. 22, 2017 by the USPTO Office for U.S. Appl. No. 15/128,035, which was filed Sep. 21, 2016 and published as U.S. Pat. No. 2017-0098311 A1 on Apr. 6, 2017 (Applicant—Michael D. Abramoff) (16 pages).

\* cited by examiner

AUTOMATED SEPARATION OF BINARY OVERLAPPING TREES

CROSS REFERENCE TO RELATED PATENT APPLICATION

This application is a national phase entry of International Patent Application No. PCT/US2014/028055, filed Mar. 14, 2014, which claims priority to U.S. Provisional Application No. 61/790,594, filed on Mar. 15, 2013, both of which are herein incorporated by reference in their entireties.

GOVERNMENT SUPPORT CLAUSE

This invention was made with government support under I01 CX000119 awarded by the Department of Veterans Affairs. The government has certain rights in the invention.

BACKGROUND

While many approaches exist for the automated segmentation of retinal vessels in fundus photographs, limited work has focused on the problem of separating the arterial from the venous trees. The few approaches that do exist for separating arteries from veins can be local and/or greedy in nature, making them susceptible to error or limiting their applicability to only the very largest vessels. Thus, there is a need for more sophisticated methods and systems for image analysis for separating arteries from veins.

SUMMARY

It is to be understood that both the foregoing general description and the following detailed description are exemplary and explanatory only and are not restrictive, as claimed. Provided are methods and systems for image analysis. In one aspect, an exemplary method can comprise receiving an image with a plurality of overlapping tree structures. A potential connectivity map (PCM) can be generated based on the plurality of tree structures. The PCM can comprise segments. Potential connectivity between segments and a corresponding cost for each potential connectivity can be determined. The PCM can be processed to separate the plurality of overlapping tree structures into separate tree structures with a minimal cost. The separate tree structures having minimal cost can be output.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular configurations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this disclosure including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Despite the fact that a great deal of work has been done for the automatic segmentation of retinal vessels in fundus photographs, relatively little work has focused on the construction of an anatomical vascular tree.

There are a few major types of methods for constructing anatomical vascular trees. One type is a growing-based method which grows the vascular tree starting from some seed points either based on the vascular image, or from a skeletonized vessels image. Another type is a grouping-based method which separates vessels into segments then rebuilds the anatomical trees.

For the growing-based method, vessels can be segmented using a threshold-based region-growing method, with the threshold value automatically generated. The segmented vascular structure is skeletonized, and transformed into a vascular forest that contains a number of directed acyclic graphs, using a graph theoretical method. A similar approach is called the region growing (ORG) technique. In the ORG technique a seed can be provided at the root of the tree. The growth, which can be started from a user-defined point, is in the direction of higher intensity. The result of ORG is a graph. However, it is not clear how the ramifications are handled. Instead of performing tracing directly on vascular regions, similar algorithms can be used to trace vessel centerlines. Starting from a seed point, vessel pixels can be found recursively along the vessel centerline. An algorithm similar to a breadth-first-search similar algorithm can be applied to handle the ramification cases.

For grouping-based methods, some approaches involve performing a grouping of vessel segments to form a minimum spanning tree, but with different minimization criteria. In an aspect, the Mahalanobis distance of features defined at each junction can be minimized. In another aspect, minimization can be performed based on linear distance and image intensity in suspected regions of connection. In one approach, the trees can be constructed by performing local to global optimization of an active contour by dynamic programming. In another approach, a bottom-up coronary artery extraction method based on the angiogram edges can be utilized. The edges can be grouped into edge segments, which are organized to bar primitives and the bars are linked to form artery segments.

In one approach, a method can first convert the vascular image to a threshold "vessel potential" image and perform perceptual grouping and contour completion. Contours can be found as minimal paths between connected components, using the fast marching algorithm. Other methods can utilize a grouping algorithm to iteratively connect ungrouped segments to form grouped segments by maximizing the continuity of the vessel using an extended Kalman filter.

Furthermore, another grouping approach comprises separating arterial and venous trees using a graph, and modeling the graph as a SAT problem. The graph structure is changeable to resolve some conflicts in order to obtain the anatomical vascular tree. However, manual inputs can be used to initialize the state, and more inputs are required if some conflicts cannot be resolved. Another approach comprises a structural mapping method which identifies landmarks first then transfers the vessel image into a graph and uses the graph search algorithm to build the tree.

Figure 1A:
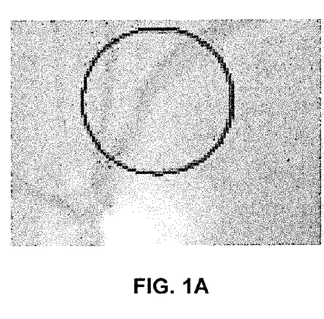
FIGS. 1A-1B are fundus images showing retinal vessels.
Figure 1B:
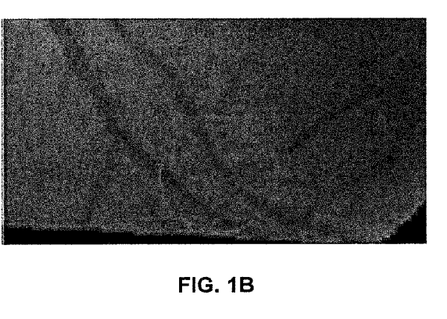

However, there are common problems with both of the aforementioned methods. The first problem is that, regardless of which criteria the previous methods adopted, when landmarks are identified (bifurcations and crossing points), the identification can heavily depended on local information, for example the neighboring pixel. Due to the imperfections of imaging, or the imperfections of vessel extraction methods, there are errors introduced when the vessels are detected. Furthermore, these errors can greatly compromise the local decisions. For example, one common error is that a crossing point may be misclassified as a bifurcation if one vessel is disconnected or removed. In addition, some complex landmarks are hard to recognize using only local information, as shown in FIGS. 1A-1B. Two overlapping vessels may be classified as one vessel with bifurcations, as shown in FIG. 1A. Additionally, the overlapping of two landmarks may be difficult to recognize locally, as shown in FIG. 1B.

Another problem is that most of these methods are basically greedy, or iterative, methods which might be trapped in a local minimum. For example, once an error is made in the early stage of the construction, the error may be propagated and exaggerated through the propagation. This is due to the lack of a mechanism for changing the morphology of a landmark once it is determined. Although one approach can dynamically change the landmarks to some degree, the changes are limited to some degree due to their greedy algorithm to resolve the conflicts in the graph.

What is needed in order to tackle these two problems is a general framework which can tolerate the errors introduced during imaging and pre-processing, model the construction of anatomical trees as an optimization problem, and solve the problem using a special graph model.

Therefore, a new, more global, optimization framework is required for separating binary overlapping trees within medical images and for application to the separation of arteriovenous trees in low-contrast color fundus images. The framework of the present methods and systems can adopt the grouping-based mechanism, which first separates vessels into segments and attempts to re-group them. In particular, the framework can have two stages. The first stage can comprise the generation of the vessel potential connectivity map (VPCM) consisting of vessel segments and indicating the potential connectivity between neighbor segments and the corresponding cost. The second stage can comprise the transfer of the VPCM into a graph and the construction of vascular trees that can be modeled so as to separate the graph into several trees of two types with a minimal cost. In one aspect, the separation of the trees can be viewed as a two color graph problem but with dynamic constraints. Using the costs calculated in the first stage, a meta-heuristic algorithm can be implemented to generate a set of feasible near-optimal solutions, and a best solution which fits the topology of the retinal vasculature best can be selected.

A more detailed description of the framework of the present methods and systems is provided below. The concept of a VPCM, the construction method, and the cost design methods can be introduced. Additionally, representative embodiments of a graph model, an optimization problem, and an algorithm to solve the problem can be presented. The post-processing to generate the construction solution in the image domain can also be presented. Experiment details and evaluated results are discussed.

The following is a general description of the concept of VPCM. To construct the anatomical vascular tree, it can be a necessary and essential procedure to obtain a correct vessel image. In the framework of the present methods and systems, the vessels can be represented by their centerline pixels. However, as previously described, the vessel image may not truly represent the whole set of vessels. The loss of vessels and the appearance of false positives may be inevitable. These errors introduced into the vessel image may dramatically change the vessel connectivity in the image domain. To resolve this problem, after the vessel centerline images are obtained, the vessels may be extended to reconnect to other vessels. This process can generate the VPCM.

In the VPCM, vessel centerlines can be separated into separated disambiguated longest vessel segments, which exhibit no landmarks except at the ends of the vessel segments. For example, the smallest unit of a vessel segment that may not be broken into shorter segments. Such a vessel segment may be referred to as a disambiguated longest vessel segment. Each segment $V_i$ has two ends $ep_{2i}$ and $ep_{2i+1}$, which can be connected to the ends of other neighboring vessels. Each set of end points in a close proximity can be defined as a neighborhood and let $N_k$ denote the $K^{th}$ neighborhood. Thus $ep_{2i}$ and $ep_{2i+1}$ are neighbors if $ep_{2i}$, $ep_{2i+1} \in N_k$, and segment are neighbors if either of their end points are neighbors. $|N_k|$ are the number of end points within $N_k$, or the number of vessels within it, and neighborhoods are only established when $|N_k|<1$.

Various properties of a neighborhood on the VPCM can be identified to serve as one or more prerequisites of an optimization model. First, it can be assumed that the anatomical connectivity between segments is included within the connectivity of segments within a neighborhood. This means that to determine the anatomical connectivity between segments, a method can check whether two segments within each neighborhood are anatomically connected. Secondly, because of the special properties of retinal vasculature that vessels of the same type do not cross, it can be assumed that in the image domain within each neighborhood, segments of the same type have to connect anatomically.

To satisfy the two assumptions, a VPCM needs to be carefully built. To start, with a vessel probability map which can be obtained using any vessel extraction methods known in the art, a vessel skeleton can be obtained by thresholding the vessel probability map and skeletonizing the vessel probability map. Then vessel segments can be obtained by separating the vessel skeleton at critical pixels which have multiple neighbors, and when the vessel direction changes dramatically.

After a set of vessel segments has been obtained, a two-step method can be used to find the potential neighboring segments for each segment by building potential neighborhoods. The first step can be to artificially extend the segments without any neighbors, until it reaches some neighbors or reaches its maximum extension. The maximum extension region can be a circular sector whose radius is r and central angle is θ. Here r is proportional to the vessel length and reciprocal to vessel tortuosity, and θ is set as 30°.

Briefly for the first step, if the extension region from $ep_i$ meets another vessel end point $ep_j$, then connect $ep_i$ to $e_j$ and its neighbors; if the extension region meets another vessel end point of $V_m$, then cut $V_m$ into two segments and connects $ep_i$ to the two new end points generated by the cutting; if the extension region meet another extension from $ep_k$, also connect $ep_i$ to $ep_k$ and its neighbors.

The second step can be to extend neighborhoods to merge their close neighborhoods. This procedure can serve to re-connect falsely separated vessels in the image domain by enlarging the neighborhood. A boundary can be drawn around each neighborhood and two neighborhoods merge together if their boundaries meet. A vessel can be removed if it is contained within a neighborhood after the merge.

Figure 2A:
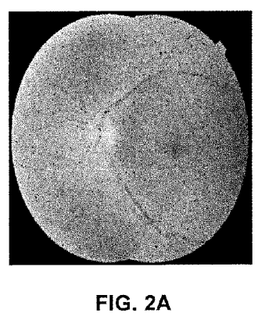
FIGS. 2A-2F are a fundus image and representations of stages in the construction of a vessel potential connectivity map corresponding to the fundus image.
Figure 2B:
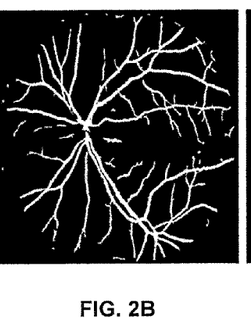
Figure 2C:
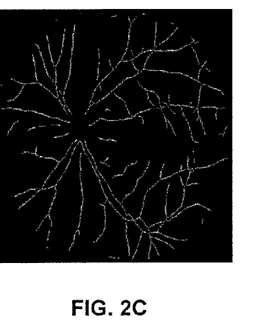
Figure 2D:
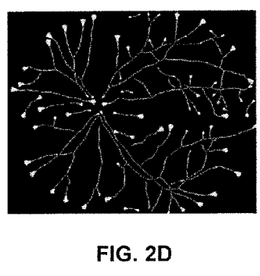
Figure 2E:
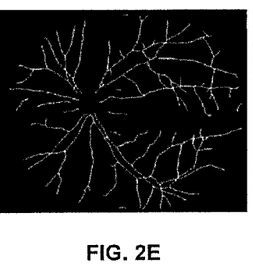
Figure 2F:
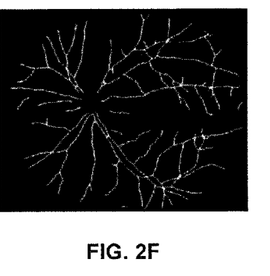

The boundary can be a convex polygon whose sides number is equal to $|N_k|$. When $|N_k| \le 4$, the boundary can be drawn in the complementary directions of the incoming vessels. When $|N| \ge 4$, the vertexes can comprise the vessel pixels $p_i$ such that $|p_i - v_i| < d$, where $v_i \in N$. To prevent over-extension, the method can limit $|N_k| \le 6$. If any merged neighborhood has more than 6 members, the merge can be undone. The results of the foregoing procedures for construction of the VPCM are shown in FIGS. 2A-2F. FIG. 2A shows an example fundus image, FIG. 2B shows an example blood vessel image, FIG. 2C shows an example of skeletonized image with brush removal, FIG. 2D shows an example of vessel extension, FIG. 2E shows an example of the neighborhoods before merging, and FIG. 2F shows the complete VPCM. Under the first assumption about the neighborhoods, to construct the anatomical trees, the method can check for each segment, whether it is connected to its neighboring segments in the VPCM. In other words, the method can check the true connectivity within each neighborhood. In addition, under the second assumption that within each neighborhood, segments of the same type have to connect, the problem of determining the anatomical connectivity between segments is equivalent to the problem of determining their types, which is determining whether each segment is artery or vein. The problem of constructing the anatomical trees on a VPCM can be viewed as to separate a graph into multiple trees with binary labeling. It can be modeled as a constrained optimization problem which finds the proper labelings for all segments with the constraint that the generated anatomical trees have no cycles and with a minimum cost of E(L) (see Eqn. (1)), where $l_i \in L$, $l_i \in [0, 1]$, and $l_i = l(_{vi}) = l(e_{p2i}) = l_i(e_{p2i+1})$, and $l_i \in l_{Nk}$ if $e_{p2i}$ or $e_{p2i+1} \in_{Nk}$.

$$\min E(L) = \sum_{k=0}^{K-1} E_N(l_{N_k}) + \beta \sum_{t \in G} F(t) \qquad \text{Eqn. (1)}$$

$$\text{Where, } E_N(l_{N_k}) = \frac{1}{P(l_{N_k} | N_k, A_{N_k})} \qquad \text{Eqn. (2)}$$

In Eqn. (1), the first term is the cost of labeling of segments within every neighborhood, as the reciprocal of the probabilities of segments labeling types (see Eqn. (2)). The probability of the segment labelings of a neighborhood $N_k$ is equivalent to the probability of different types of landmarks a neighborhood could be (e.g. branching point versus crossing point), which can be calculated given its property matrix $A_{Nk}$ (Eqn. (2)). The second term is the global costs which evaluate the topological properties of constructed trees given a VPCM G. While the general form of the terms here can be used for describing the overall algorithm, provided herein is more detail about how to calculate these costs after the general approach is provided to solve this model. Because of the NP-hard nature of this constrained optimization problem, a special graph model can be designed to incorporate the global constraint of the anatomical trees and generate a set of candidate solutions on the graph domain, using the first term of Eqn. (1). These candidate solutions can then be transferred back to image domains to be evaluated and/or combined with the second term, to obtain the final solution.

In one aspect, configurations and costs of local neighborhoods can be determined. When a VPCM is complete, the potential anatomical configurations and the costs of the configuration can be evaluated for each neighborhood. For example, when |N|=2, there can be two possible configurations: either the two vessels connect, or they disconnect.

Figure 3A:
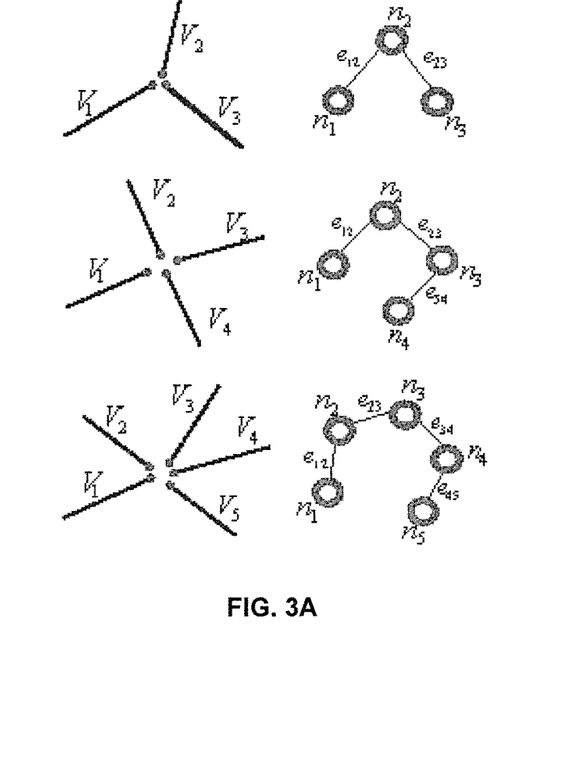
FIGS. 3A-3B are representations of vessel neighborhoods and the transfer of vessel neighborhoods to a graph.
Figure 3B:
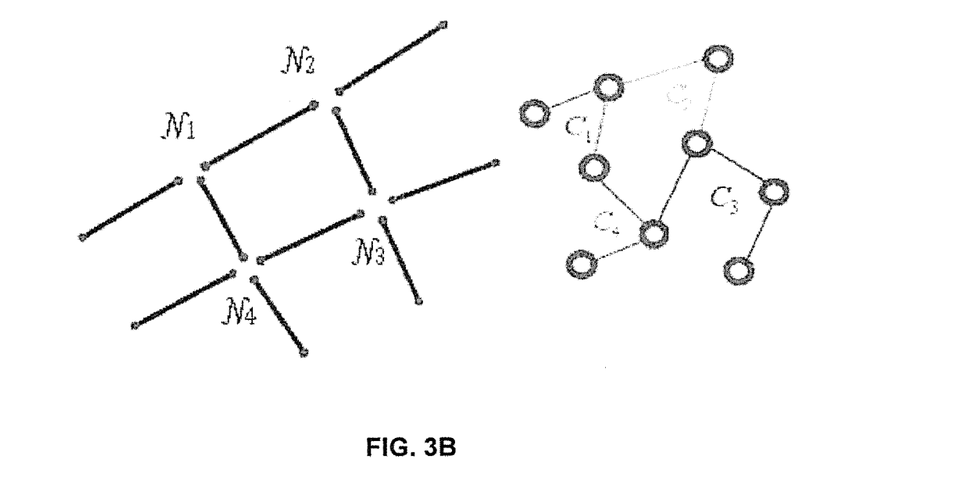

In the graph model, each vertex $n_i$ can represent a vessel segment $V_i$, and an edge $e_{ij}$ can represent a relation between vessels $V_i$ and $V_j$ within an N. The edges can be constructed in a special manner only within each neighborhood. For each neighborhood N in the VPCM, with |N|=n, n−1 edges can be applied to connect the n vertexes to form a tree, in order to keep every vertex connected and prevent a cycle, as shown in FIGS. 3A-3B. In this construction, every neighborhood N can be constructed to a tree-style small graph, as shown in FIG. 3A. In addition, the concept of cluster C can be introduced in the graph corresponding to the neighborhood in the image domain which can comprise a set of edges generated by end points within one neighborhood. If $ep_i$ and $ep_j \in N_k$, and an edge $e_{ij}$ can be constructed in the graph domain, then $e_{ij} \in C_k$. FIG. 3A shows examples of 3-p, 4-p and 5-p neighborhoods, wherein values of N in the image domain are transferred to corresponding clusters in the graph specifically. In this manner, a VPCM may be transferred into a planar graph. FIG. 3B shows an example VPCM in which four neighborhoods can be transferred to a graph. Four neighborhoods in the image domain can correspond to the four clusters in the graph whose edges are indicated in different colors In order to represent the optimization problem in the image domain, each vertex can be labeled by one of two colors, although all vertexes in FIGS. 3A, 3B are shown in black for illustrative purposes. The two colors can indicate whether the corresponding vessels are in the same type or in different types. In one aspect, each edge can be associated with one of two constraints: equality or inequality. An equality constraint can dictate that the two vertexes connected by an edge be in the same color. The inequality constraint can dictate that a two vertexes connected by an edge be in different color.

Using this graph construction, the equivalence of the vessel labeling problem, and the connectivity problem within each neighborhood in the image domain can be transferred into the graph at the cluster level.

Within a cluster in the graph, the edge constraints can be self-consistent, wherein any combinations of edge constraints can generate one and only one feasible color solution. Additionally, a feasible color solution can generate one and only one combination of edge constraints. Thus, a feasible color solution may be understood to refer to color vertexes in two colors, satisfying the edge constraints. However, since the two colors can be considered equivalent, a pair of complementary solutions of color labeling may be equal, and thus considered to be one feasible color solution.

Figure 4:
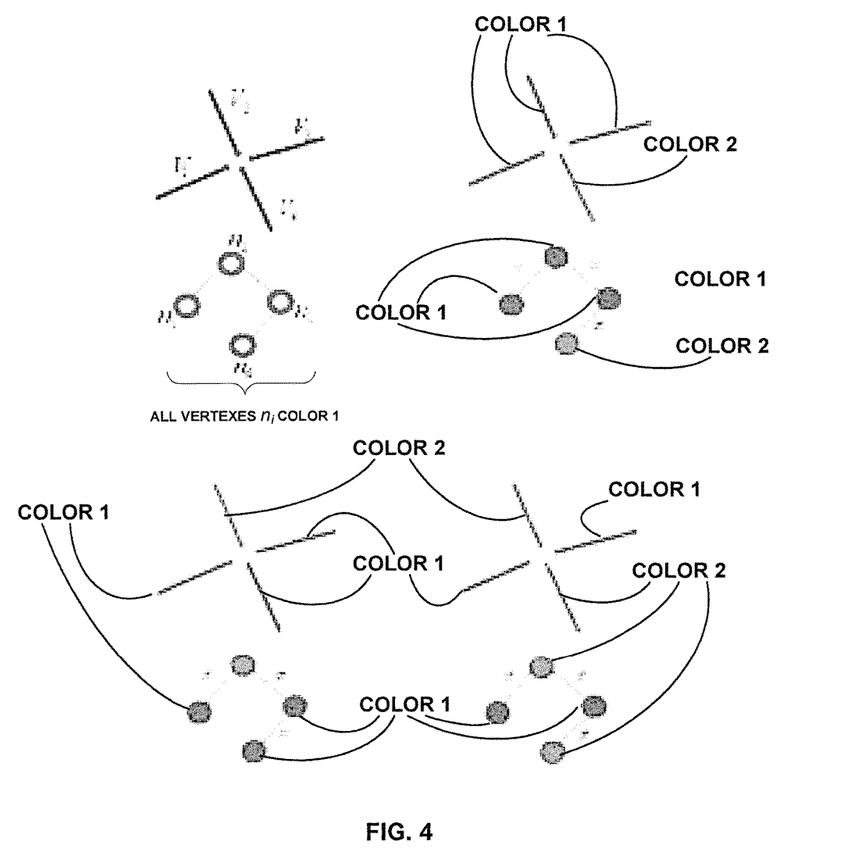
FIG. 4 is a representation of a vessel neighborhood and potential configurations corresponding to the vessel neighborhood.

When the VPCM is transferred into the graph, the potential configurations can also be transformed into corresponding edge combinations of the constructed cluster, and the cost may also be attached. FIG. 4 shows an example of a 4-p neighborhood at the top of the upper left quadrant. The three potential configurations can correspond to the 4-p neighborhood also shown in FIG. 4, at the top of the upper right, the lower left and the lower right quadrants. The bottom of each quadrant can include the corresponding clusters in the graph domain, the edge constraints, and the color labeling. The vessels $V_i$ and the vertexes $n_i$ corresponding to each of the foregoing are also shown in FIG. 4. While all vessels $V_i$ and vertexes $n_i$ are shown in black for illustrative purposes in FIG. 4, it will be understood that FIG. 4 is intended to represent a two color image. Accordingly, the vessels $V_i$ and vertexes $n_i$ shown therein are labeled either Color 1 or Color 2.

In this example, the colors of the potential configuration in the upper right quadrant of FIG. 4 can indicate that vessels 1, 2 and 3 are the same type and connected, and that vessel 4 can be another type and disconnected from them. This color scheme can also indicate there can be a bifurcation formed by vessel 1, 2 and 3, and that vessel 4 can be falsely connected to the vessel. The colors of the potential configuration in the lower left quadrant indicate that vessels 1, 3 and 4 can form a bifurcation. The colors of the potential configuration in the lower right quadrant can indicate that vessels 1 and 3 are the same type, and thus are connected. It also shows vessels 2 and 4 are the other type, which can indicate that this neighborhood may be a crossing point.

Thus, the optimization problem in the VPCM can be transferred to the graph domain in order to determine the proper edge combinations for each cluster, such that there can be a feasible color solution for the graph while having a minimum sum of the associated costs. If there is no cycle in the graph, the graph may indicate a trivial problem since any combination of edge constraints can generate one feasible color solution. Thus, to obtain the minimum cost, it may only be necessary to choose the combination of edge constraints with the lowest cost. However, if there is a cycle, the problem can be more difficult. This problem is discussed in more detail below.

In one aspect, logical constraints must be considered. A conflict cycle can be defined as a cycle with an odd number of inequality edges. If there is a conflict cycle in the graph, there is no feasible solution to color vertexes on the cycle with two colors. Cycles may occur if substantially more connectivity can be generated in the VPCM, which may not be anatomical connectivity. Thus, the cycle may be considered to be part of the global topological tree cost in terms of the graph constraints.

In one aspect, heuristic algorithms can be implemented. A heuristic algorithm for solving the problem when the graph has cycles can be provided in the framework of the present methods and systems. Accordingly, a solution s may be defined as the choices of edge constraints on a graph, and a feasible solution may be defined as a solution such that vertexes can be colored in two colors, which is when there is no conflict cycle in the graph. The heuristic algorithm may take an initial solution and generate a set of near-optimal feasible solutions.

To solve the problem, a sub-problem given a planar graph and the constraints on edges can be solved in order to determine whether a feasible color solution can be found.

Thus, to solve the sub-problem, a cycle base of the graph can be detected. Given a graph with n vertexes and m edges, a cycle base can be a set of m−(n−1) cycles that are independent, in the sense that one cycle may not be reconstructed from the set by the union of two or more other cycles of the set.

Each cycle in the cycle base may then be checked to determine whether it may be a conflict cycle. A cycle base can be detected using a Depth-First Search Algorithm (DFS). Thus, the sub-problem can be checking the feasibility of a solution. This can be solved in O(|m|).

Starting from an initial solution, the algorithm can check the feasibility by counting the number of conflict cycles. If there are conflict cycles, the algorithm can change the edge constraints in order to reduce the number of conflict cycles. The algorithm may keep a solution pool to update each solution during every conflict cycle removal procedure. The algorithm may stop when enough feasible solutions are generated, or the iteration number reaches the maximum limit. The following Algorithm 1 can be a general pseudo-code of a heuristic algorithm, where n is the number of feasible solutions required, and iter is the maximum iteration time.

---
Algorithm 1: Algorithm for finding optimal feasible solutions, given a graph G with cycle base B, n, m, initial sol t, and iter
---

Initialize sol pool S with t, initialize feasible sol pool F← ∅
while |F| < n & i < iter do
    Initialize sol pool S'
    for each solution s ∈ S do
        C ← FindConflictCylce(s, B)
        if |C| = 0 then
            put s into F if s not ∈ F
        else
            sol pool N ← permutateEdgeConstraint (s, C, m) (see Algorithm 2, below)
            for each solution n in N do
                put n in F if it is feasible; otherwise put n in S'
            end for
        end if
    end for
    S' ← S', i ← i +1
end while
return F ---
Algorithm 2: PermutateEdgeConstraint given s, C, m (From within Algorithm 1)
---

Initialize sol pool S← ∅, i ← 0
while |S| < m do
    c ← CycleSelection(C)
    find clusters on c, k ← 0, l ← 0
    for j ← 0; j < m/|C| do
        select a configuration config based on costs added with random noise
        s' ← UpdateSolution(s, config)
        C' ← FindConflictCylce (s', B)
        if C' = C or |C'| ≥ |C| + 1 then
            disregard s', k ← k +1
        else
            put s' in S if s not ∈ S
            j ← j + 1, k ← 0
        end if
        if k ≥ |m| then
            k ← 0, l ← l + 1
        end if
    end for
    i ← i + 1
end while
return S Within the algorithm 1, the key component may be the permutateEdgeConstraint (s, C, m) algorithm (see algorithm 2) which permutates the edge constraints of clusters given the conflict cycles. Firstly the algorithm 2 randomly chooses a conflict cycle to resolve. If there are adjacent cycles, they have higher priority to be chosen. The algorithm 2 considers edges on the conflict cycle and finds their corresponding clusters. All the potential configurations of these clusters are sorted based on their costs. Random Gaussian noise is added during the sorting to enlarge the search region to prevent being trapped in some local minima. The algorithm 2 starts to change the configurations based on their costs one at a time, then to check if the number of conflict cycles are reduced. m is the number of solutions generated. j controls the relaxation of the cycle reducing criteria. The idea is that if there is only couple of solutions which have fewer cycles, it indicates that the algorithm might meet a local minimum. To escape from the local minimum and increase the search space, the methods can tolerate the solutions which have more cycles than the current solution.

In order to find the minimum, local and global knowledge can be used to calculate costs in Eqn 1. For the first term, the methods can calculate $P(l_{N_k}|N_k, A_{N_k})$ by combining local knowledge and the global knowledge of the retinal vasculature using different algorithms according to $|N_k|$ as the probabilities of landmark types that each neighborhood $N_k$ can represent.

Global knowledge can be motivated from a concept of blood flow since blood flows for arteries from the optic disc (OD) to the periphery of the image, and in the reversed direction for veins. Defining the flow direction as from the tail to the head, two end points of a segment can be distinguished as a head and a tail. Since a tail cannot connect to a tail and neither does a head, heads and tails are main parameters of the disclosed methods to calculate the probabilities. Local properties are the angle $\theta_{ij}$ between directions of segments within one neighborhood, and the distances $d_{gh}$ between their ends.

When $|N_k|>3$, the possible landmark types can be limited with prior information. Specifically, when $|N_k|=5$, the methods can consider the case that $\Sigma_{epi \in Nk} l_i=2$, which represents the case of the overlapping of a bifurcation and a crossing point. When $|N_k|=6$, the method can consider the cases that $\Sigma_{epi \in Nk} l_i=2$ and $\Sigma_{epi \in Nk} l_i=3$. The former represents the overlapping of two close bifurcations in one vessel and a crossing point; the latter represents the overlapping of two bifurcations.

The second term of Eqn 1 is the global cost which is imposed to filter the optimal solution out from the candidate solutions obtained from algorithm 1. The global cost can evaluate the topology of the resulted trees to check if they fit the topology of the retinal vasculature. The global cost is expressed in Eqn 3. The first term of Eqn 3 is the distance of every tree root to the optic disc. The second term is the bifurcation evaluator at each bifurcation. And $\theta_1$ are $\theta_2$ the angles between two children vessels and the parent vessel; and $l_1$ and $l_2$ are lengths of two children vessels.

$$F(G) = \Sigma_{t \in G} d(t) + \beta \Sigma_{t \in G} \Sigma_{b \in t} h(b) \qquad \text{Eqns. (3)}$$

where, $$h(b) = l_1 e^{(\pi/2 - \theta_1)} + l_2 e^{(\pi/2 - \theta_2)}$$

Figure 5:
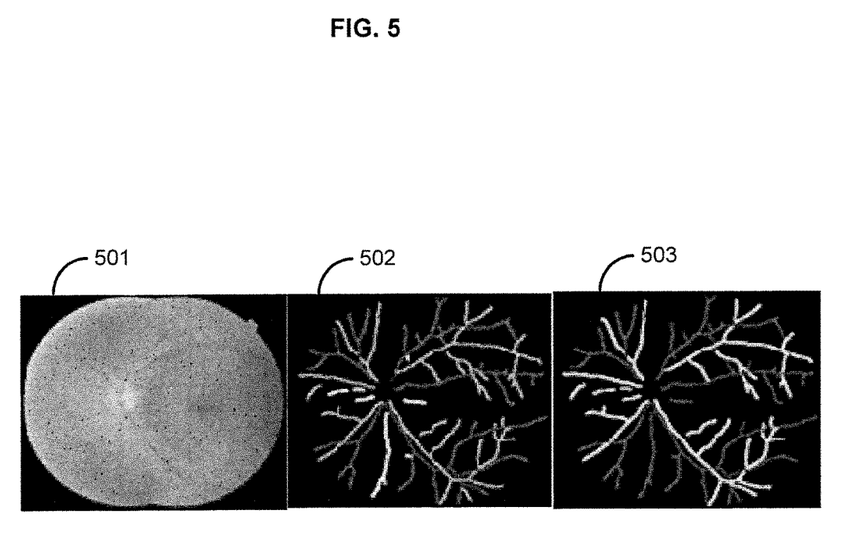
FIG. 5 illustrates visual examples of a fundus image, the reference standard by an expert, and the result of tree analysis.

In one aspect, the methods and systems can be described through an example experiment and results. The present methods and systems were tested on thirty color low-contrast fundus images. A mask was manually applied in order to mask any vessels within the optic disc. Any vessel segments contacting the optic disc boundary could be considered as a root. The VPCM can usually be separated into independent sub-VPCMs each of which are transferred to a graph. A solution in the image domain can comprise a vessel labeled in two colors. Note that the two color labeling may only indicate the connectivity. Thus, a binary decision may be used to recognize arterial and venous trees. FIG. 5 illustrates the original fundus image 501, the ground truth 502, and the visual result 503.

To evaluate the performance of the algorithm, a semi-ground truth can be generated by manually labeling vessel types on the VPCM by an expert referring to the original fundus image. Four types of vessels may be labeled: arteries (A), veins (V), overlapping of both (O), false positive (FP) and uncertain (U). For example, the centerline images generated by the algorithm for arteries and veins can be labeled. Thus, all FP or U can be excluded from the evaluation.

Since the graph model does not perform on a simple sub-VPCM, the evaluation can consider sub-VPCMs with more than one neighborhood. The accuracy of the labeling may be calculated for each sub-VPCM in every test image.

Accordingly, the present methods and systems can comprise a general framework for constructing anatomical vascular trees in medical images. Based on vessel segmentation images, the present methods and systems can build a vessel connectivity map to repair connectivity between vessels in the image domain. The true anatomical connectivity can be determined using a graph model and may be solved globally. In addition, the performance of the framework of the present methods and systems can be enhanced by embedding advanced techniques into the framework, such as using a pattern recognition approach to learn the costs, or by applying more advanced heuristic algorithms.

Figure 6:
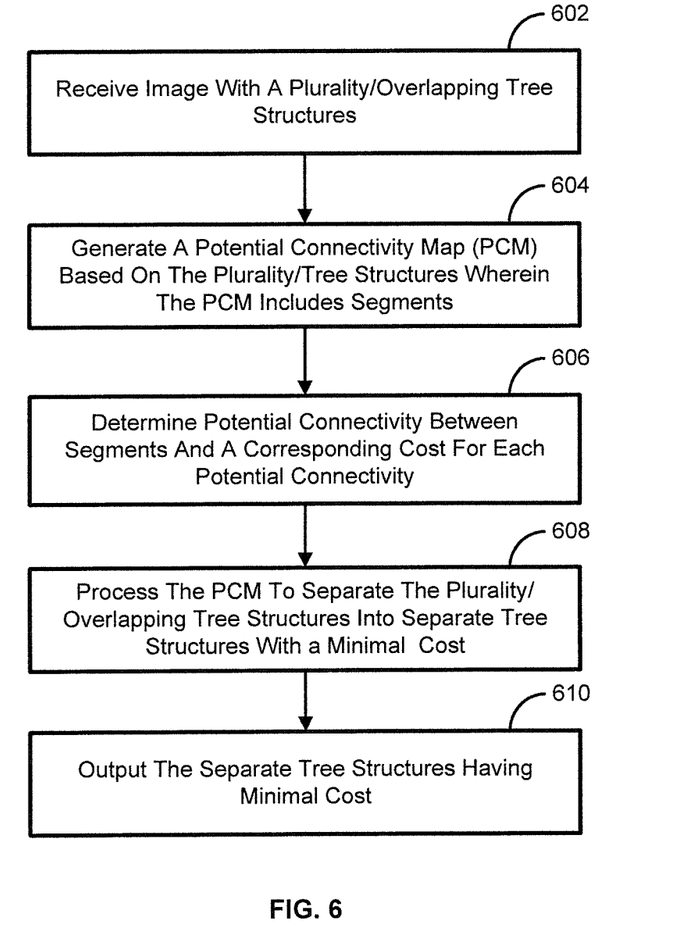
FIG. 6 is a flowchart of an exemplary method for image analysis.

FIG. 6 is a flow chart illustrating an exemplary method for image analysis. At block 602, an image with a plurality of overlapping tree structures can be received. The plurality of overlapping tree structures can comprise a plurality of overlapping anatomical vascular trees. At block 604, a potential connectivity map (PCM) can be generated based on the plurality of tree structures. For example, the PCM can comprise segments. The segments can comprise vessel segments. In one aspect, generating the potential connectivity map (PCM) based on the plurality of tree structures can comprise separating vessel centerlines into separated disambiguated longest vessel segments which exhibit no landmarks except at both ends.

At block 606, potential connectivity between segments and a corresponding cost for each potential connectivity can be determined. In one aspect, determining the potential connectivity between segments and a corresponding cost for each potential connectivity can comprise determining neighbor segments from among the segments and determining the potential connectivity between neighbor segments.

At block 608, the PCM can be processed to separate the plurality of overlapping tree structures into separate tree structures with a minimal cost. For example, processing the PCM to separate the plurality of overlapping tree structures into separate tree structures with a minimal cost can comprise transferring the PCM into a graph model. At block 610, the separate tree structures having minimal cost can be outputted.

The present methods and systems can be a framework for solving the overlapping tree problem. In one aspect, the overlapping trees can comprise one or more lower dimensional projections of a higher dimensional tress. The overlapping tree can comprise a two dimensional projection of a three dimension binary tree structure. The overlapping trees can comprise multiple independent overlapping non-connected subtrees, and the overlapping subtrees each can comprise binary overlapping trees. The binary tree can comprise arterial and venous subtrees. A segmentation algorithm can be applied to obtain a set of longest (e.g., disambiguated) segments that do not exhibit branching or crossing. The segmentation algorithm can comprise a combination of pixel based classification with skeletonization. The segmentation algorithm can comprise a vessel tracking algorithm. The segmentation algorithm can comprise any other segmentation approach known in the art.

The disambiguation can comprise classifying branch and crossing points and cutting the segmentation into a set of segments. Disambiguation can also comprise identifying branch, cross properties on the skeletons. A correction can be applied to the disambiguated longest segments set. The overlapping tree can be solved by labeling each disambiguated longest segment in the set. The set labeling can have the lowest global cost of all potential achievable labelings. The labeling can be solved by generating multiple potential achievable labelings and sorting them by global cost. Generating an achievable labeling can be done by a constraint satisfaction approach, and the constraint satisfaction can comprise converting the longest disambiguated segment set into an undirected graph and placing constraints on all possible pairs from the longest disambiguated segment set.

The constrained pairs can be limited by some heuristic, for example, where each longest disambiguated segment in the set has a connectivity region on both ends. The heuristic can comprise one or more of width, orientation, pixel color, distance, and optimal features to neighboring segments. In one aspect, the orientation can be based on some expectation of orientation based on the location of the segment. The constraints for each segment pair can be based on equality and inequality labeling. Heuristics or machine learning or rules can be used to simplify the set of constraints and make them feasible.

The constraint satisfaction approach can be solved by optimization. In one aspect, the global cost can be a function of the candidate labeling, and the function can comprise a weighted combination of one or more of balance of labeling, width differences, orientation differences, and intensity differences. The weights can be assigned using machine learning. The machine learning can use one of SVM, random trees, KNN, regression, or other procedures for machine labeling known to those skilled in the art.

The overlapping subtrees problem solution can be used to assign labels to each of the subtrees. The labels can be from artery, vein and or lymphoid. The overlapping subtrees can be imaged as digital images or volumes. For example, the images can comprise color images, fundus images, and/or OCT volumes. The sets of multiple overlapping subtree solutions can be merged using heuristics and constraints.

Figure 7:
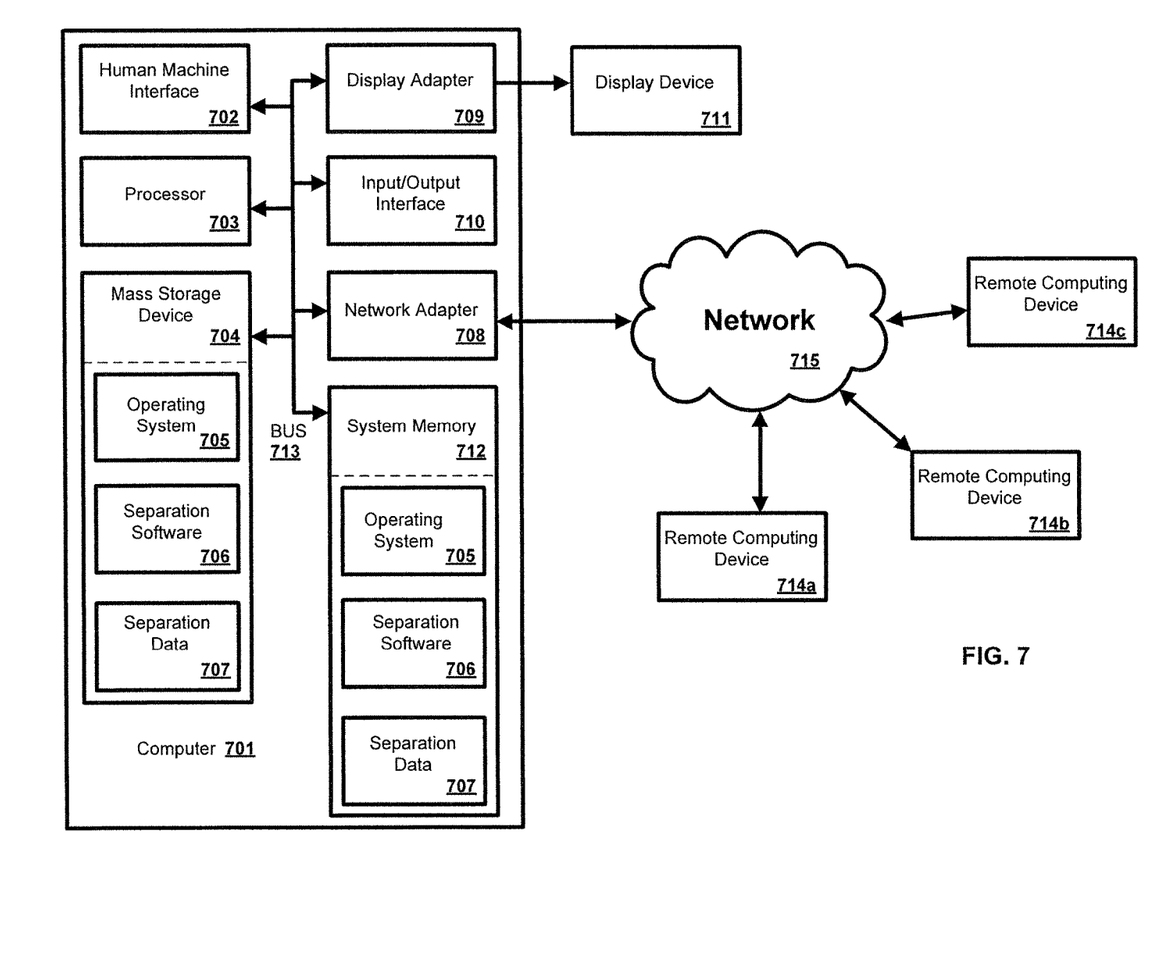
FIG. 7 is a block diagram illustrating an exemplary operating environment for in which the present methods and systems can operate.

In an exemplary aspect, the methods and systems can be implemented on a computer 701 as illustrated in FIG. 7 and described below. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, and mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, separation software 706, separation data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as separation data 707 and/or program modules such as operating system 705 and separation software 706 that are immediately accessible to and/or are presently operated on by the processing unit 703.

In another aspect, the computer 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computer 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and separation software 706. Each of the operating system 705 and separation software 706 (or some combination thereof) can comprise elements of the programming and the separation software 706. Separation data 707 can also be stored on the mass storage device 704. Separation data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computer 701 can have more than one display adapter 709 and the computer 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computer 701 via Input/Output Interface 710. Any step and/or result of the methods can be output in any form to an output device. Such output can be any form of visual representation, including, but not limited to, textual, graphical, animation, audio, tactile, and the like.

The computer 701 can operate in a networked environment using logical connections to one or more remote computing devices 714a,b,c. By way of example, a remote computing device can be a personal computer, portable computer, a server, a router, a network computer, a peer device or other common network node, and so on. Logical connections between the computer 701 and a remote computing device 714a,b,c can be made via a local area network (LAN) and a general wide area network (WAN). Such network connections can be through a network adapter 708. A network adapter 708 can be implemented in both wired and wireless environments. Such networking environments are conventional and commonplace in offices, enterprise-wide computer networks, intranets, and the Internet 715.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of separation software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method for image analysis, comprising:
receiving an image comprising a plurality of overlapping tree structures;
generating a potential connectivity map (PCM) based on the plurality of overlapping tree structures, wherein the PCM comprises segments;
determining potential connectivity between the segments and a corresponding cost for each potential connectivity by artificially extending the segments until one or more of: a respective neighbor is reached or a respective maximum extension is reached, wherein the maximum extension comprises a circular sector based on a radius proportional to a segment length measured from a head of the segment to a tail of the segment;
processing the PCM to separate the plurality of overlapping tree structures into separate tree structures with a minimal cost; and
outputting the separate tree structures having minimal cost.

2. The method of claim 1, wherein the plurality of overlapping tree structures comprises a plurality of overlapping anatomical vascular trees.

3. The method of claim 2, wherein the segments are vessel segments.

4. The method of claim 3, wherein generating the PCM based on the plurality overlapping of tree structures comprises separating vessel centerlines into separated disambiguated longest vessel segments which exhibit no landmarks except at each end.

5. The method of claim 4, wherein separating vessel centerlines into separated disambiguated longest vessel segments comprises:
classifying branch and crossing points for each vessel segment; and
separating each vessel segment into a set of disambiguated longest vessel segments.

6. The method of claim 1, wherein determining the potential connectivity between the segments and the corresponding cost for each potential connectivity comprises determining neighbor segments from among the segments and determining the potential connectivity between neighbor segments.

7. The method of claim 1, wherein processing the PCM to separate the plurality of overlapping tree structures into separate tree structures with the minimal cost comprises transferring the PCM into a graph model.

8. A system for image analysis, comprising:
a memory having computer-executable instructions encoded thereon; and
at least one processor functionally coupled to the memory and configured, by the computer-executable instructions, for:
receiving an image comprising a plurality of overlapping tree structures;
generating a potential connectivity map (PCM) based on the plurality of overlapping tree structures, wherein the PCM comprises segments;
determining potential connectivity between the segments and a corresponding cost for each potential connectivity by artificially extending the segments until one or more of: a respective neighbor is reached or a respective maximum extension is reached, wherein the maximum extension comprises a circular sector based on a radius proportional to a segment length measured from a head of the segment to a tail of the segment;
processing the PCM to separate the plurality of overlapping tree structures into separate tree structures with a minimal cost; and
outputting the separate tree structures having minimal cost.

9. The system of claim 8, wherein the plurality of overlapping tree structures comprises a plurality of overlapping anatomical vascular trees.

10. The system of claim 9, wherein the segments are vessel segments.

11. The system of claim 10, wherein generating the PCM based on the plurality of overlapping tree structures comprises separating vessel centerlines into separated disambiguated longest vessel segments which exhibit no landmarks except at each end.

12. The system of claim 11, wherein separating vessel centerlines into separated disambiguated longest vessel segments comprises:
classifying branch and crossing points for each vessel segment and
separating each vessel segment into a set of disambiguated longest vessel segments.

13. The system of claim 8, wherein determining the potential connectivity between the segments and the corresponding cost for each potential connectivity comprises determining neighbor segments from among the segments and determining the potential connectivity between neighbor segments.

14. The system of claim 8, wherein processing the PCM to separate the plurality of overlapping tree structures into separate tree structures with the minimal cost comprises transferring the PCM into a graph model.

15. A non-transitory computer readable medium having computer-executable instructions encoded thereon for image analysis, said computer-executable instructions adapted to be executed to implement a method comprising:
receiving an image comprising a plurality of overlapping tree structures;
generating a potential connectivity map (PCM) based on the plurality of overlapping tree structures, wherein the PCM comprises segments;
determining potential connectivity between the segments and a corresponding cost for each potential connectivity by artificially extending the segments until one or more of: a respective neighbor is reached or a respective maximum extension is reached, wherein the maximum extension comprises a circular sector based on a radius proportional to a segment length measured from a head of the segment to a tail of the segment;
processing the PCM to separate the plurality of overlapping tree structures into separate tree structures with a minimal cost; and
outputting the separate tree structures having minimal cost.

16. The non-transitory computer readable medium of claim 15, wherein the plurality of overlapping tree structures comprises a plurality of overlapping anatomical vascular trees.

17. The non-transitory computer readable medium of claim 16, wherein the segments are vessel segments.

18. The non-transitory computer readable medium of claim 17, wherein generating the PCM based on the plurality of overlapping tree structures comprises separating vessel centerlines into separated disambiguated longest vessel segments which exhibit no landmarks except at each end.

19. The non-transitory computer readable medium of claim 15, wherein determining potential connectivity between the segments and the corresponding cost for each potential connectivity comprises determining neighbor segments from among the segments and determining the potential connectivity between neighbor segments.

20. The non-transitory computer readable medium of claim 15, wherein processing the PCM to separate the plurality of overlapping tree structures into separate tree structures with the minimal cost comprises transferring the PCM into a graph model.

* * * * *